United States Patent
Shiraiwa et al.

(10) Patent No.: US 11,791,671 B2
(45) Date of Patent: Oct. 17, 2023

(54) CHARGING SEAT AND PROGRAM

(71) Applicant: TOYOTA JIDOSHA KABUSHIKI KAISHA, Toyota (JP)

(72) Inventors: Yuka Shiraiwa, Fuji (JP); Hirotaka Saito, Sunto-gun (JP); Yuma Matsumoto, Susono (JP); Takahiro Uchida, Susono (JP); Shuji Moriyama, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 155 days.

(21) Appl. No.: 17/482,587

(22) Filed: Sep. 23, 2021

(65) Prior Publication Data
US 2022/0200363 A1 Jun. 23, 2022

(30) Foreign Application Priority Data
Dec. 21, 2020 (JP) .................. 2020-211775

(51) Int. Cl.
| | | |
|---|---|---|
| A61H 3/00 | (2006.01) | |
| H02J 7/00 | (2006.01) | |
| H02J 50/10 | (2016.01) | |
| H02J 50/80 | (2016.01) | |
| H02J 50/90 | (2016.01) | |

(52) U.S. Cl.
CPC .............. *H02J 50/90* (2016.02); *A61H 3/00* (2013.01); *H02J 7/00034* (2020.01); *H02J 7/0042* (2013.01); *H02J 50/10* (2016.02); *H02J 50/80* (2016.02); *A61H 2003/007* (2013.01); *A61H 2201/165* (2013.01)

(58) Field of Classification Search
CPC ............... A61H 3/00; A61H 2003/007; A61H 2201/165; H02J 7/00034; H02J 7/0042; H02J 50/05; H02J 50/10; H02J 50/12; H02J 50/80; H02J 50/90
See application file for complete search history.

(56) References Cited

U.S. PATENT DOCUMENTS

| | | | |
|---|---|---|---|
| 2010/0049333 A1 | 2/2010 | Endo et al. | |
| 2010/0113986 A1* | 5/2010 | Ashihara | A61H 3/00 601/5 |
| 2011/0018498 A1* | 1/2011 | Soar | B60N 2/90 320/108 |
| 2015/0326061 A1* | 11/2015 | Davison | H02J 7/0044 320/108 |
| 2019/0097437 A1* | 3/2019 | Cho | A61H 1/024 |
| 2019/0247697 A1* | 8/2019 | Park | A63B 21/4011 |

FOREIGN PATENT DOCUMENTS

JP 2010-075658 A 4/2010

* cited by examiner

*Primary Examiner* — Levi Gannon
(74) *Attorney, Agent, or Firm* — Oliff PLC

(57) ABSTRACT

A charging seat includes a processor having hardware. The processor is configured to detect that a user is seated in a seat portion, detect an electric assistance apparatus that is worn by the user and assists the user in walking, and supply electric power in conformity with a charging standard of the electric assistance apparatus to the electric assistance apparatus.

16 Claims, 4 Drawing Sheets

CHARGING SEAT AND PROGRAM

CROSS-REFERENCE TO RELATED APPLICATION

This application claims priority to Japanese Patent Application No. 2020-211775 filed on Dec. 21, 2020, incorporated herein by reference in its entirety.

BACKGROUND

1. Technical Field

The present disclosure relates to a charging seat and a program.

2. Description of Related Art

Japanese Unexamined Patent Application Publication No. 2010-075658 (JP 2010-075658 A) discloses a wearable aid that is worn on the body of a user as an electric assistance apparatus that assists the user in walking. In the configuration disclosed in JP 2010-075658 A, the output change of an actuator depending on the state of charge of a battery can make the user recognize that the remaining amount of the battery is low.

SUMMARY

However, there is a concern that, when there is no charging place around the user, such as when going out, the charge amount of the battery cannot be increased and electric power is used up.

The present disclosure has been made in view of the above circumstances and provides a charging seat and a program by which electric power can be supplied to an electric assistance apparatus that assists a user in walking.

A first aspect of the disclosure relates to a charging seat including a processor having hardware. The processor is configured to detect that a user is seated in a seat portion, detect an electric assistance apparatus that is worn by the user and assists the user in walking, and supply electric power in conformity with a charging standard of the electric assistance apparatus to the electric assistance apparatus.

A second aspect of the disclosure relates to a program causing a processor having hardware to execute detecting that a user is seated in a seat portion, detecting an electric assistance apparatus that is worn by the user and assists the user in walking, and supplying electric power in conformity with a charging standard of the electric assistance apparatus to the electric assistance apparatus.

According to the present disclosure, it is possible to supply electric power to the electric assistance apparatus that assists the user in walking.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a charging seat and a program according to embodiments of the present disclosure will be described in detail with reference to the drawings. The present disclosure is not limited to the embodiments described below.

Figure 1:
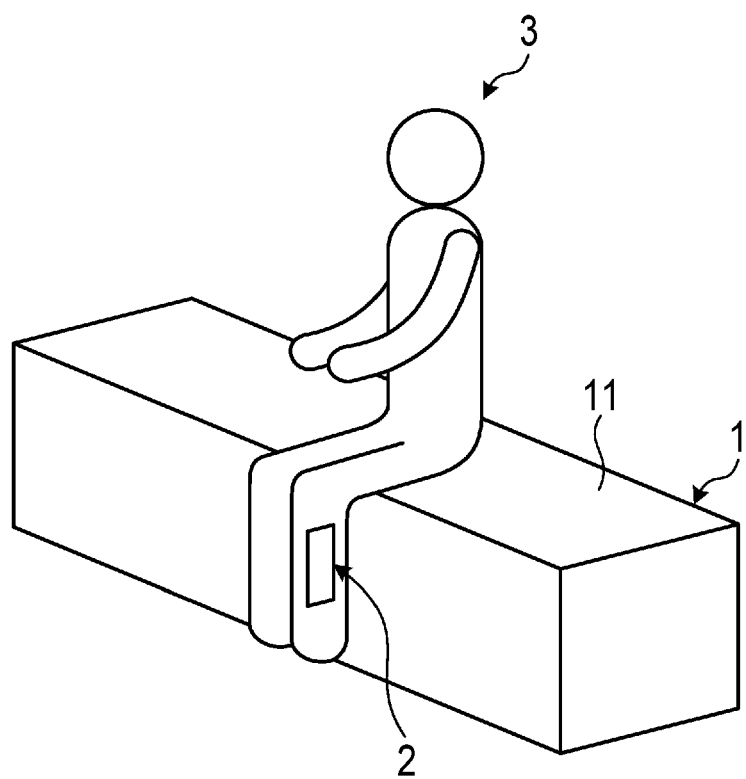
FIG. 1 is a schematic view showing the schematic configuration of a charging seat according to an embodiment.

FIG. 1 is a schematic view showing the schematic configuration of the charging seat according to the embodiment. As shown in FIG. 1, a charging seat 1 is a seat in which a user 3 wearing a wearable aid 2 is seated, and is a charging device that supplies electric power to the wearable aid 2. The wearable aid 2 is an electric assistance apparatus that assists the user 3 in walking in a state in which the wearable aid 2 is worn on the body of the user 3. The wearable aid 2 is worn on the leg of the user 3 and electrically assists in the bending and extension of the leg joint. For example, the wearable aid 2 is worn on the ankle of the user 3 and electrically assists in the plantarflexion and dorsiflexion of the ankle. Alternatively, the wearable aid 2 is worn on the knee of the user 3 and electrically assists in the flexion and extension of the knee. Alternatively, the wearable aid 2 is worn on the thigh of the user 3 and electrically assists in the initial swing and the terminal swing of the leg.

In a state in which the user 3 is seated in a seat portion 11 of the charging seat 1, the wearable aid 2 can be charged with electric power that is supplied from the charging seat 1. The charging seat 1 is installed in the place away from the user 3's home. The charging seat 1 can be installed indoors, outdoors, inside a moving body, or the like. Examples of the installation place of the charging seat 1 include a hospital waiting room, a commercial facility, a station, a priority seat on a train, a bus stop, a priority seat on a bus, and a park.

Figure 2:
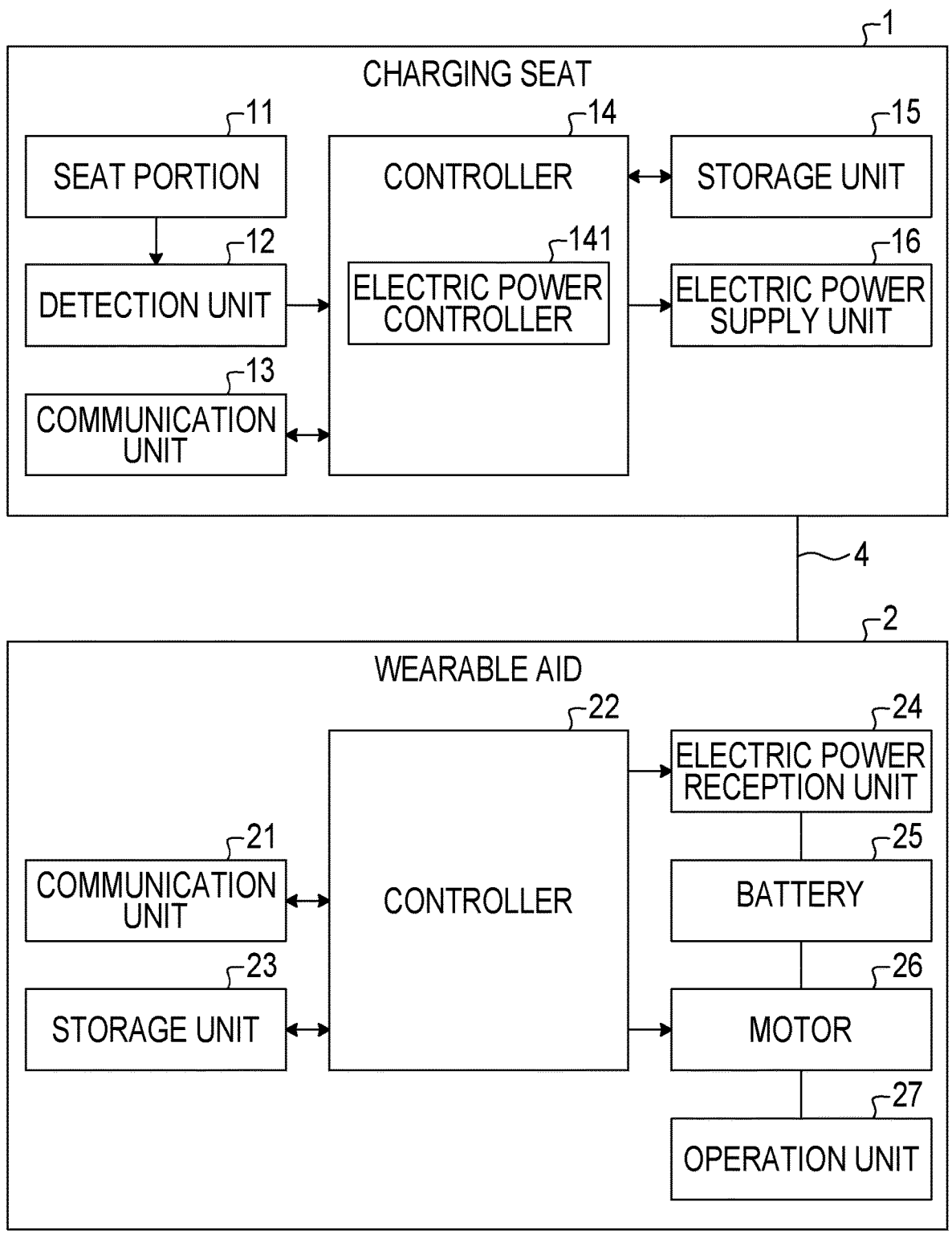
FIG. 2 is a block diagram showing functional blocks of the charging seat and a wearable aid.

FIG. 2 is a block diagram showing functional blocks of the charging seat and the wearable aid. As shown in FIG. 2, the charging seat 1 includes the seat portion 11, a detection unit 12, a communication unit 13, a controller 14, a storage unit 15, and an electric power supply unit 16.

The seat portion 11 is a portion in which the user 3 is seated. For example, the seat portion 11 is formed of a seat surface and a backrest. Further, when the charging seat 1 is a single chair, there is one seat portion 11 for one charging seat 1. When the charging seat 1 is a bench, such as a loveseat, there is a plurality of the seat portions 11 for one charging seat 1.

The detection unit 12 is a sensor which detects that the user 3 is seated in the seat portion 11 of the charging seat 1. That is, the detection unit 12 is formed of a seat sensor. For example, the detection unit 12 is formed of a reflective infrared sensor, a load sensor, or the like. When the detection unit 12 is a load-type seat sensor, the installation place may be under the seat surface or the inside of the backrest (rear surface). In other words, the detection unit 12 is provided at a position that corresponds to the seat portion 11, and the number of the detection units 12 that are provided corresponds to the number of the seat portions 11. When the detection unit 12 detects that the user 3 is seated, a detection signal is output from the detection unit 12 to the controller 14. When there are the seat portions 11, the controller 14 can discriminate which seat portion 11 a human is seated in, based on the signal from the detection unit 12.

The communication unit 13 communicates with the wearable aid 2. For example, when the charging seat 1 is connected to the wearable aid 2 via a charging cable 4, the communication unit 13 can perform wired communication with the wearable aid 2 via the charging cable 4. On the other hand, when the charging seat 1 is not connected to the wearable aid 2 via the charging cable 4, the communication unit 13 can perform wireless communication with the wearable aid 2. The communication unit 13 is controlled by the controller 14. Further, information acquired by the communication unit 13 is output to the controller 14.

The controller 14 includes a processor and a memory. The processor includes a central processing unit (CPU), a digital signal processor (DSP), a field-programmable gate array (FPGA), and the like. The memory is a main storage device, and includes a random access memory (RAM), a read only memory (ROM), and the like. The controller 14 loads a program stored in the storage unit 15 into the work area of the memory (main storage device) and executes the program, and controls each component or the like through the execution of the program to realize a function serving a predetermined purpose.

Further, the controller 14 has an electric power controller 141. The electric power controller 141 executes charge control of supplying the electric power from the charging seat 1 to the wearable aid 2. When the electric power controller 141 executes the charge control, the electric power controller 141 controls the electric power supply unit 16. For example, when the signal in which the seating of the user 3 is detected is received from the detection unit 12 to the controller 14 as an input, the electric power controller 141 controls the electric power supply unit 16 to supply the electric power from the charging seat 1 to the wearable aid 2.

The storage unit 15 is formed of a recording medium, such as an erasable programmable ROM (EPROM). Various programs that are executed by the controller 14 are stored in the storage unit 15. For example, a program that is used to execute the charge control of supplying the electric power from the charging seat 1 to the wearable aid 2 is stored in the storage unit 15.

The electric power supply unit 16 is a charger that supplies the electric power to the wearable aid 2. The electric power supply unit 16 is electrically connected to an external electric power source or a battery. For example, when the charging seat 1 is installed in a park, the electric power supply unit 16 is electrically connected to an external electric power source or a battery provided in the charging seat 1. Alternatively, when the charging seat 1 is installed in the priority seat on a train, the electric power supply unit 16 is electrically connected to an external electric power source or an internal electric power source (battery mounted on the train). Alternatively, when the charging seat 1 is installed in a commercial facility, the electric power supply unit 16 is electrically connected to an external electric power source via an outlet provided in the commercial facility. The electric power supply unit 16 supplies the electric power, such as an external electric power source, to the wearable aid 2 under the control of the electric power controller 141. The electric power supply unit 16 may include a connection port with the charging cable 4, that is, a charge port on the electric power supply side. Alternatively, the charging cable 4 may be always connected to the charging seat 1, or may be carried by the user 3 and connected solely during charging.

The wearable aid 2 includes a communication unit 21, a controller 22, a storage unit 23, an electric power reception unit 24, a battery 25, a motor 26, and an operation unit 27. The communication unit 21, the controller 22, and the storage unit 23 included in the wearable aid 2 are physically the same as the communication unit 13, the controller 14, and the storage unit 15 included in the charging seat 1.

The communication unit 21 communicates with the charging seat 1. For example, when the wearable aid 2 is connected to the charging seat 1 via the charging cable 4, the communication unit 21 can perform wired communication with the charging seat 1 via the charging cable 4. On the other hand, when the wearable aid 2 is not connected to the charging seat 1 via the charging cable 4, the communication unit 21 can perform wireless communication with the charging seat 1.

The controller 22 executes charge control of charging the electric power supplied from the charging seat 1. When the controller 22 executes the charge control, the controller 22 controls the electric power reception unit 24. For example, when the controller 22 detects that the wearable aid 2 is connected to the charging seat 1 via the charging cable 4, the controller 22 determines that the ready state for charging is entered. Then, when the ready state for charging is reached, the controller 22 controls the electric power reception unit 24 to charge the battery 25 with the electric power supplied from the charging seat 1.

Further, the controller 22 executes electric assistance control of assisting the user 3 in walking, based on the program stored in the storage unit 23. The controller 22 executes the electric assistance control to drive the motor 26 by using the electric power of the battery 25. When the motor 26 is driven, the operation unit 27 is operated by power output from the motor 26. At that time, the controller 22 controls the torque and the rotation speed of the motor 26 to control the operation amount of the operation unit 27. The operation amount of the operation unit 27 is an assistance amount that is used to assist in the operation of the user 3.

The electric power reception unit 24 is an electrical device on the electric power reception side that receives the electric power supplied from the charging seat 1. The electric power reception unit 24 is electrically connected to the battery 25. The electric power reception unit 24 may include a connection port with the charging cable 4, that is, a charge port on the electric power reception side.

The battery 25 is a storage battery that stores the electric power to be supplied to the motor 26. The battery 25 is formed of a secondary battery, such as a lithium ion battery. For example, the battery 25 is electrically connected to the electric power supply unit 16 of the charging seat 1 via the charging cable 4. The wearable aid 2 charges the battery 25 with the electric power supplied from the charging seat 1 under the control of the controller 22. Further, the battery 25 is electrically connected to the motor 26. Therefore, the electric power with which the battery 25 is charged can be supplied to the motor 26.

The motor 26 is an electric motor that is driven by using the electric power stored in the battery 25. The power that is output from the motor 26 is transmitted to the operation unit 27. For example, a member (power transmission member) that is used to transmit the power is provided between the rotation shaft of the motor 26 and the operation unit 27.

The operation unit 27 is an assistance unit that causes the power of the motor 26 to act on the leg of the user 3, and is a member that is worn on the leg of the user 3. For example, the operation unit 27 is worn on the ankle of the user 3 and is operated so as to assist in the plantarflexion and dorsiflexion of the ankle. Alternatively, the operation unit 27 is worn on the knee of the user 3 and is operated so as to assist in the flexion and extension of the knee. Alternatively, the operation unit 27 is worn on the thigh of the user 3 and is operated so as to assist in the initial swing and the terminal swing of the leg.

Figure 3:
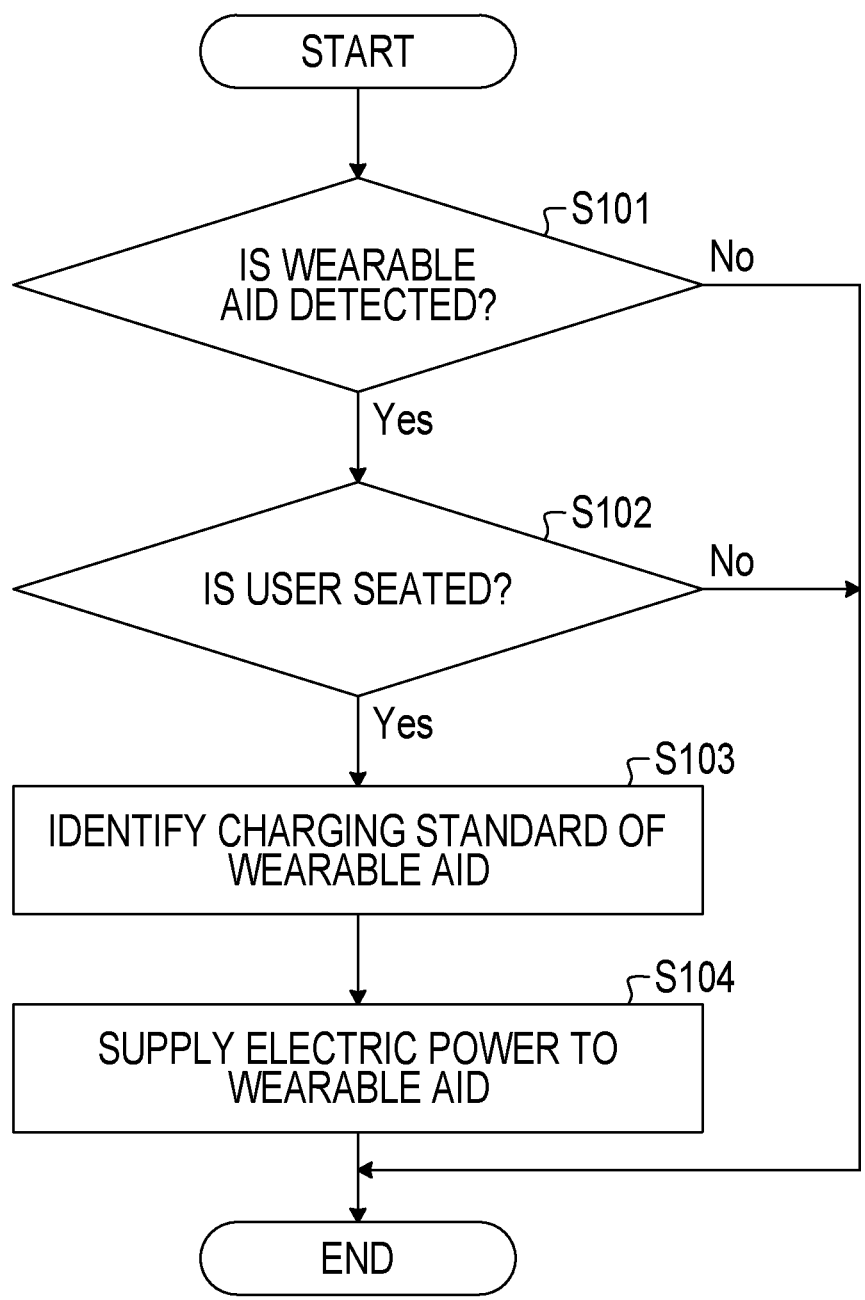
FIG. 3 is a flowchart showing the processing flow of charge control.

FIG. 3 is a flowchart showing the processing flow of the charge control. The processing shown in FIG. 3 is performed by the controller 14.

The controller 14 determines whether or not the wearable aid 2 is detected (step S101). In step S101, wireless communication by the communication unit 13 is performed and determination is made whether or not the wearable aid 2 exists around the charging seat 1. In short, in step S101, before the controller 14 detects the seating of the human, the controller 14 determines whether or not the wearable aid 2 that exists in surroundings is detected.

For example, the controller 14 sets a range of several meters centered on the charging seat 1 as a target area, and determines whether or not a signal transmitted from the communication unit 21 of the wearable aid 2 is received within the range. The range is a preset value, and may be in the range of several meters or the range of more than 10 meters. Further, the controller 14 may output the signal from the communication unit 13 in the range, and determine whether or not the wearable aid 2 that outputs a signal in response to the signal exists.

When determination is made that the wearable aid 2 is not detected (step S101: No), the control routine ends.

When determination is made that the wearable aid 2 is detected (step S101: Yes), the controller 14 determines whether or not the user 3 wearing the wearable aid 2 is seated in the charging seat 1 (step S102). In step S102, determination is made whether or not the human is seated in the seat portion 11 and whether or not the seated human is a wearer (user 3) of the wearable aid 2.

For example, in step S102, the controller 14 determines whether or not the seating of the human in the seat portion 11 is detected by the detection unit 12. When the seating of the human is detected by the detection unit 12, the controller 14 determines that the human is seated in the seat portion 11. Further, the controller 14 determines whether or not the charging seat 1 is connected to the wearable aid 2 via the charging cable 4. When the controller 14 determines that the charging seat 1 is connected to the wearable aid 2 via the charging cable 4, the controller 14 determines that the seated human is the wearer of the wearable aid 2. In this way, in step S102, determination is made whether or not the wearer of the wearable aid 2 detected in step S101 is seated in the charging seat 1.

When determination is made that the user 3 wearing the wearable aid 2 is not seated in the charging seat 1 (step S102: No), the control routine ends. For example, when the seating of the human is not detected by the detection unit 12, negative determination is made in step S102. Also, when the seated human is not the wearer of the wearable aid 2 even when the seating of the human is detected by the detection unit 12, negative determination is made in step S102. Specifically, when the controller 14 determines that the connection to the wearable aid 2 via the charging cable 4 is not detected even when the controller 14 determines that the seating of the human is detected, the controller 14 determines that the seated human is not the user 3. In this case, determination is made whether or not the connection to the wearable aid 2 via the charging cable 4 is detected, within a predetermined time after the seating is detected by the detection unit 12. When the predetermined time has elapsed, negative determination is made in step S102.

On the other hand, when determination is made that the user 3 wearing the wearable aid 2 is seated in the charging seat 1 (step S102: Yes), the controller 14 identifies the charging standard of the wearable aid 2 (step S103). The charging standard is defined by rated voltage and current. In step S103, information is acquired from the wearable aid 2 through the wired communication with the wearable aid 2 via the charging cable 4, and the charging standard of the wearable aid 2 is identified based on the acquired information. Information for identifying the charging standard is stored in the storage unit 15 of the charging seat 1. When the controller 14 detects the wired connection with the wearable aid 2, the controller 14 identifies the charging standard of the wearable aid 2 to be charged based on the information from the wearable aid 2 and the information stored in the storage unit 15.

Then, the controller 14 supplies the electric power to the wearable aid 2 based on the identified charging standard (step S104). In step S104, the electric power is supplied from the electric power supply unit 16 to the electric power reception unit 24 under the control of the electric power controller 141. That is, the charge control is performed in step S104. At that time, the electric power controller 141 controls the supplied electric power such that the rated voltage and the current conform to the charging standard of the wearable aid 2. When the processing of step S104 is performed, the control routine ends.

As described above, according to the embodiment, the charging seat 1 can supply the wearable aid 2 with electric power when going out. Further, the user 3 wearing the wearable aid 2 is seated in the charging seat 1 to enable the reception of the charge to the battery 25.

In the example shown in FIG. 3, the method of identifying the charging standard of the wearable aid 2 by the connection with the charging cable 4 has been described, but the identification method is not limited thereto. That is, the method of identifying the charging standard of the wearable aid 2 is not limited to information acquisition through the wired communication. For example, when the wearable aid 2 is detected through the wireless communication in step S101, information for making it possible to identify the charging standard may be acquired from the wearable aid 2 through the wireless communication at the same time as the detection of the wearable aid 2. When the charging standard of the wearable aid 2 is identified through the wireless communication in this way, the processing of step S103 may be omitted. In the control routine in which step S103 is omitted, when affirmative determination is made in step S102, the process proceeds from step S102 to step S104. In step S102, determination is made whether or not the wearer of the wearable aid 2 that corresponds to the charging standard identified in step S101 is seated. On the other hand, in the control routine in which step S103 is not omitted, when affirmative determination is made in step S102, determination is made that the charging standard identified in step S103 matches the charging standard identified in step S101. In any case, the charging seat 1 can identify the charging standard of the wearable aid 2 before the user 3 is seated, and the seating of the user 3 can specify the wearable aid 2 to be charged.

Further, in the example shown in FIG. 3, the charging method using the charging cable 4 has been described, but the charging method is not limited thereto. For example, the charging seat 1 may supply the wearable aid 2 with the electric power through wireless charging. In this case, the charging seat 1 includes an electric power transmission coil, and the wearable aid 2 includes an electric power reception coil. As an example, the electric power supply unit 16 includes the electric power transmission coil, and the electric power reception unit 24 includes the electric power reception coil. In this case, the electric power transmission coil is installed at a position of the charging seat 1 corresponding to the position of the wearable aid 2 in consideration of the posture of the seated user 3. For example, assuming a type in which the wearable aid 2 is worn on the waist (when the electric power reception coil is positioned in the waist), the electric power transmission coil is disposed in the backrest of the charging seat 1. Alternatively, assuming a type in which the wearable aid 2 is worn on the leg (when the electric power reception coil is positioned in the leg), the electric power transmission coil is disposed in a leg portion of the charging seat 1. When the controller 14 detects the seating of the user 3 in step S102, the controller 14 causes the current to flow through the electric power transmission coil.

Further, as a modification example, charge control may be started after the seating of the human in the seat portion 11 of the charging seat 1 is detected. The processing flow of the charge control in the modification example is illustrated in FIG. 4.

Figure 4:
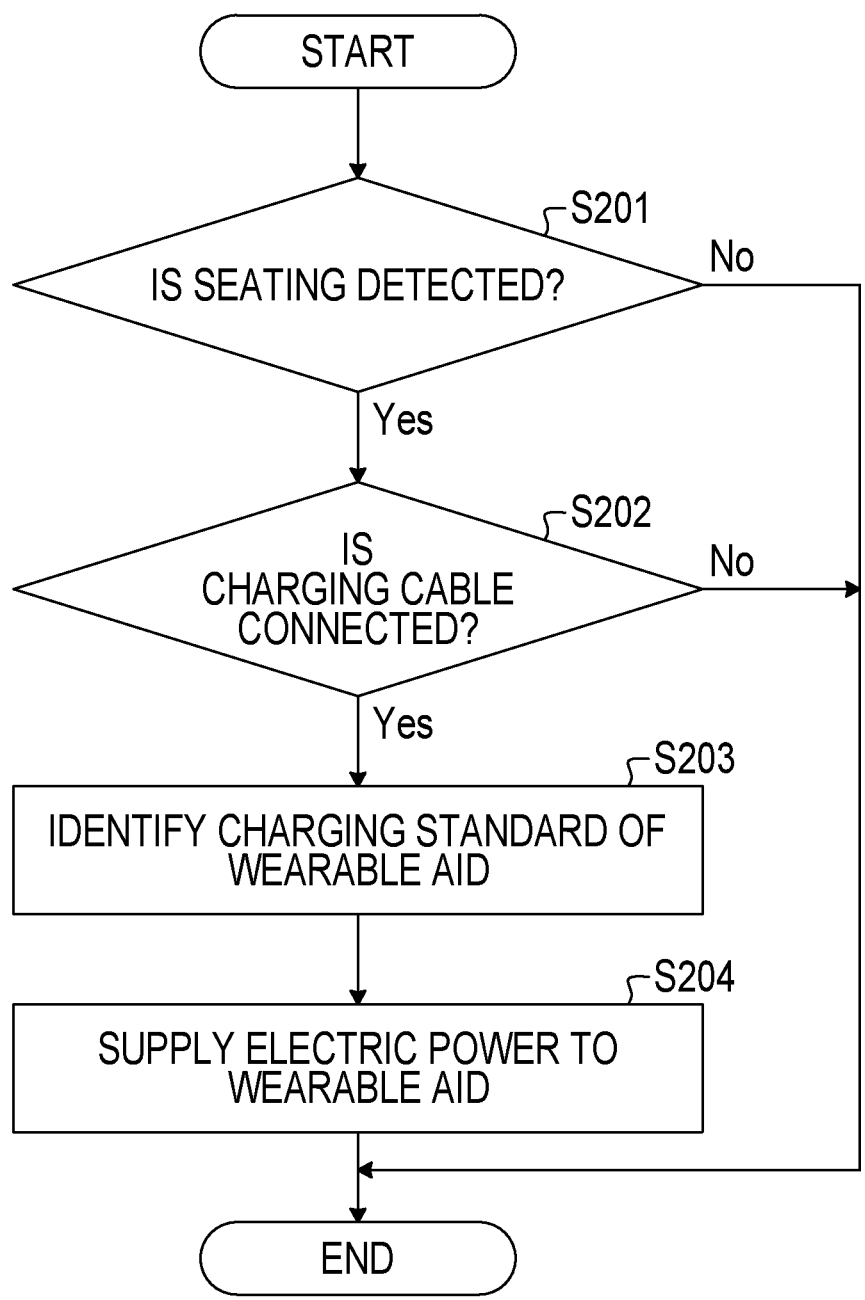
FIG. 4 is a flowchart showing the processing flow of charge control in a modification example.

FIG. 4 is a flowchart showing the processing flow of the charge control in the modification example. The processing shown in FIG. 4 is performed by the controller 14. Further, since the processing of step S203 and step S204 shown in FIG. 4 is the same as the processing of step S103 and step S104 shown in FIG. 3, the description thereof will be omitted.

The controller 14 determines whether or not the human is seated in the charging seat 1 (step S201). In step S201, determination is made whether or not the seating of the human in the seat portion 11 is detected by the detection unit 12. That is, in step S201, the seating of the human is determined regardless of whether or not the human is the wearer of the wearable aid 2.

When determination is made that the human is not seated in the charging seat 1 (step S201: No), the control routine ends.

When determination is made that the human is seated in the charging seat 1 (step S201: Yes), the controller 14 determines whether or not the charging seat 1 is connected to the wearable aid 2 via the charging cable 4 (step S202). In step S202, determination is made whether or not the connection to the wearable aid 2 via the charging cable 4 is detected, within a predetermined time after the seating of the human is detected in step S201.

When determination is made that the charging seat 1 is not connected to the wearable aid 2 via the charging cable 4 (step S202: No), the control routine ends.

On the other hand, when determination is made that the charging seat 1 is connected to the wearable aid 2 via the charging cable 4 (step S202: Yes), the control routine proceeds to step S203.

In this way, after the human is seated in the seat portion 11, the charging seat 1 may determine whether or not the human is the user 3 wearing the wearable aid 2. Therefore, step S201 and step S202 may be combined into one determination step. That is, when the connection of the charging cable 4 is detected, determination may be made that the user 3 wearing the wearable aid 2 is seated in the seat portion 11.

Further, in step S202 shown in FIG. 4, the wearable aid 2 may be detected by a method different from the presence/absence of connection via the charging cable 4. For example, when the electric power is supplied from the charging seat 1 to the wearable aid 2 through wireless charging, the wearable aid 2 may be detected through the wireless communication by the communication unit 13 in step S202. In this case, in step S203, the charging standard of the wearable aid 2 can be identified based on the information acquired through the wireless communication in step S202.

Further effects and modification examples can be easily derived by those skilled in the art. The broader aspects of the present disclosure are not limited to the particular details and representative embodiments shown and described above. Therefore, various changes can be made without departing from the spirit or scope of the general disclosure concept defined by the appended claims and the equivalents thereof.

What is claimed is:

1. A charging seat comprising a processor having hardware, wherein the processor is configured to
   detect that a user is seated in a seat portion,
   detect an electric assistance apparatus that is worn by the user and assists the user in walking,
   identify a charging standard of the electric assistance apparatus through communication with the electric assistance apparatus,
   detect that the charging seat is electrically connected to the electric assistance apparatus via a charging cable, and
   supply electric power in conformity with the charging standard of the electric assistance apparatus to the electric assistance apparatus.

2. The charging seat according to claim 1, wherein the processor is configured to detect, before the processor detects that the user is seated in the seat portion, the electric assistance apparatus that exists in surroundings through wireless communication with the electric assistance apparatus.

3. The charging seat according to claim 2, wherein the processor is configured to identify the charging standard of the electric assistance apparatus before the processor detects that the user is seated, based on information acquired from the electric assistance apparatus through the wireless communication.

4. The charging seat according to claim 3, wherein the processor is configured to
   determine whether or not the user wearing the electric assistance apparatus detected through the wireless communication is seated in the seat portion, and
   supply, when determination is made that the user wearing the electric assistance apparatus is seated in the seat portion, the electric power in conformity with the charging standard to the electric assistance apparatus.

5. The charging seat according to claim 1, wherein the processor is configured to detect, after the processor detects that the user is seated in the seat portion, the electric assistance apparatus that is worn by the user seated in the seat portion through wireless communication with the electric assistance apparatus.

6. The charging seat according to claim 5, wherein the processor is configured to identify the charging standard of the electric assistance apparatus after the processor detects that the user is seated, based on information acquired from the electric assistance apparatus through the wireless communication.

7. The charging seat according to claim 1, wherein the processor is configured to detect that the charging seat is connected to the electric assistance apparatus via the charging cable to detect the electric assistance apparatus.

8. The charging seat according to claim 1, wherein the processor is configured to detect that the charging seat is connected to the electric assistance apparatus via the charging cable to determine that the user wearing the electric assistance apparatus is seated in the seat portion.

9. The charging seat according to claim 1, wherein the processor is configured to perform wired communication with the electric assistance apparatus via the charging cable, and identify the charging standard of the electric assistance apparatus based on information acquired from the electric assistance apparatus through the wired communication.

10. A non-transitory computer-readable storage medium having stored thereon a program, the program being executable by a processor to perform a method, comprising:

detecting that a user is seated in a seat portion of a charging seat;

detecting an electric assistance apparatus that is worn by the user and assists the user in walking;

causing the processor to execute identifying a charging standard of the electric assistance apparatus through communication with the electric assistance apparatus;

causing the processor to execute detecting that the charging seat is electrically connected to the electric assistance apparatus via a charging cable; and supplying electric power in conformity with the charging standard of the electric assistance apparatus to the electric assistance apparatus.

11. The non-transitory computer-readable storage medium according to claim 10, causing the processor to execute detecting, before the processor detects that the user is seated in the seat portion, the electric assistance apparatus that exists in surroundings through wireless communication with the electric assistance apparatus.

12. The non-transitory computer-readable storage medium according to claim 11, causing the processor to execute identifying the charging standard of the electric assistance apparatus before the processor detects that the user is seated, based on information acquired from the electric assistance apparatus through the wireless communication.

13. The non-transitory computer-readable storage medium according to claim 12, causing the processor to execute:

determining whether or not the user wearing the electric assistance apparatus detected through the wireless communication is seated in the seat portion; and supplying, when determination is made that the user wearing the electric assistance apparatus is seated in the seat portion, the electric power in conformity with the charging standard to the electric assistance apparatus.

14. The non-transitory computer-readable storage medium according to claim 10, causing the processor to execute detecting, after the processor detects that the user is seated in the seat portion, the electric assistance apparatus that is worn by the user seated in the seat portion through wireless communication with the electric assistance apparatus.

15. The non-transitory computer-readable storage medium according to claim 14, causing the processor to execute identifying the charging standard of the electric assistance apparatus after the processor detects that the user is seated, based on information acquired from the electric assistance apparatus through the wireless communication.

16. The non-transitory computer-readable storage medium according to claim 10, causing the processor to execute detecting that the charging seat is connected to the electric assistance apparatus via the charging cable to detect the electric assistance apparatus.

* * * * *